United States Patent
Plote et al.

(10) Patent No.: US 7,017,337 B2
(45) Date of Patent: Mar. 28, 2006

(54) METHOD AND DEVICE FOR CONTROLLING AN EXHAUST GAS AFTERTREATMENT SYSTEM

(75) Inventors: Holger Plote, Fellbach-Oeffingen (DE); Ralf Schernewski, Saint-Ouen Cedex (DE); Michael Walter, Kornwestheim (DE); Horst Harndorf, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 10/416,687

(22) PCT Filed: Oct. 10, 2001

(86) PCT No.: PCT/DE01/03885

§ 371 (c)(1),
(2), (4) Date: Oct. 23, 2003

(87) PCT Pub. No.: WO02/38933

PCT Pub. Date: May 16, 2002

(65) Prior Publication Data

US 2004/0055279 A1    Mar. 25, 2004

(30) Foreign Application Priority Data

Nov. 11, 2000   (DE) .................. 100 56 034

(51) Int. Cl.
*F01N 3/00*    (2006.01)
(52) U.S. Cl. .............. 60/295; 60/274; 60/297; 60/311
(58) Field of Classification Search .......... 60/274, 60/295, 297, 311
See application file for complete search history.

(56) References Cited

U.S. PATENT DOCUMENTS

| | | | | |
|---|---|---|---|---|
| 4,452,040 A | * | 6/1984 | Kobashi ............ | 60/274 |
| 4,597,262 A | * | 7/1986 | Retallick .......... | 60/274 |
| 4,630,438 A | * | 12/1986 | Shinzawa ......... | 60/274 |
| 4,685,290 A | * | 8/1987 | Kamiya et al. .... | 60/274 |
| 4,881,369 A | | 11/1989 | Kanesaki | |
| 5,941,066 A | * | 8/1999 | Araki et al. ....... | 60/280 |
| 6,237,326 B1 | * | 5/2001 | Russell ............. | 60/274 |
| 6,397,587 B1 | * | 6/2002 | van Nieuwstadt et al. | 60/297 |
| 6,422,001 B1 | * | 7/2002 | Sherman et al. ... | 60/274 |
| 6,557,340 B1 | * | 5/2003 | Twigg et al. ..... | 60/275 |

FOREIGN PATENT DOCUMENTS

| | | |
|---|---|---|
| DE | 197 46 855 | 4/1999 |
| DE | 199 06 287 | 8/2000 |
| EP | 0 867 604 | 9/1998 |
| EP | 0 943 786 | 9/1999 |
| FR | 2 774 421 | 8/1999 |
| WO | WO 99 35386 | 7/1999 |
| WO | WO 01 61162 | 8/2001 |

* cited by examiner

*Primary Examiner*—Thomas Denion
*Assistant Examiner*—Diem Tran
(74) *Attorney, Agent, or Firm*—Kenyon & Kenyon

(57) ABSTRACT

A method and a device for controlling an exhaust gas aftertreatment system, in which a first state variable characterizes the state of the exhaust gas aftertreatment system. A second state variable takes into consideration additional influences on the special operating state. A special operating state is initiated as a function of the first and the second state variable.

22 Claims, 7 Drawing Sheets

| | | Load | | | | |
|---|---|---|---|---|---|---|
| | | low | medium | high | | |
| TL | cold | bad | bad | medium | cold | TM |
| | | bad | medium | medium | medium | |
| | | medium | medium | medium | warm | |
| | medium | bad | medium | medium | cold | |
| | | medium | medium | medium | medium | |
| | | medium | medium | good | warm | |
| | warm | medium | medium | medium | cold | |
| | | medium | medium | good | medium | |
| | | medium | good | good | warm | |

| | | Regenerating Condition | | |
|---|---|---|---|---|
| Particle | | good | medium | bad |
| | very low | off | off | off |
| | low | | off | off |
| | medium | on | | off |
| | high | on | on | |
| | very high | on | on | on |

METHOD AND DEVICE FOR CONTROLLING AN EXHAUST GAS AFTERTREATMENT SYSTEM

FIELD OF THE INVENTION

The present invention relates to a method and a device for controlling an exhaust gas aftertreatment system.

BACKGROUND INFORMATION

In German Published Patent Application No. 199 06 287, the exhaust gas aftertreatment system includes a particulate filter, which is used particularly for directly injecting internal combustion engines. In that case, the loading of the particulate filter is recorded as the state variable, and, when certain values are exceeded, a special operating state is initiated in which the particulate filter is regenerated by suitable measures.

In this context, the regeneration is carried out only as a function of the loading of the particulate filter, i.e. of the mass of soot present in the particulate filter, which is ascertained by suitable methods. Each regeneration of the particulate filter requires additional fuel, which, for example, is metered in a postinjection operation or which is appropriately metered to elevate the exhaust gas temperature.

SUMMARY OF THE INVENTION

A method and a device for controlling an internal combustion engine using an exhaust gas aftertreatment system, so as to reduce the increased consumption which occurs in a special operating state.

The increased fuel consumption in the special operating state can be clearly reduced on account of the fact that a second state variable is ascertained, which takes into consideration further influences on the special operating state, and that the special operating state is initiated as a function of the first and/or the second state variable. Thereby it is particularly ensured that the special operating state may be initiated when the conditions for the special operating state are favorable.

It is especially favorable if, as a function of the first and/or the second state variable, different operating states are initiated. This means, for example, that different measures for regeneration are initiated as a function of the loading state of the particulate filter. This may further mean, that different measures for regeneration are initiated as a function of the operating state of the internal combustion engine.

It is particularly advantageous if the second state variable characterizes the state of the internal combustion engine, the environmental conditions and/or the type of driver. Because the state of the internal combustion engine and/or the environmental conditions are taken into consideration, the operating states in which the conditions are favorable for regeneration may be used for carrying it out. Thus, for example, a high value in the exhaust gas temperature is required for regeneration. This high value of the exhaust gas temperature is approximately reached at certain operating points. At these operating points the regeneration may be carried out in a relatively simple manner.

It is of particular advantage if the first state variable is determined as a function of measured variables or control variables. Because measured variables are taken into consideration, the state of the exhaust gas aftertreatment system may be determined relatively accurately. Ascertainment of the state variable is particularly simple and cost-effective if this is simulated starting from the measured variables and control variables which are already at hand. In that case, no additional sensors are needed.

An especially accurate and simple control comes about if one or several of the following quantities are used to ascertain especially the second state variable. These are especially quantities which characterize a rotational speed of the internal combustion engine, a fuel injection quantity, a load, an exhaust gas volume flow, a temperature magnitude, a driving speed and/or a time since the last special operating state. The exhaust gas temperature downstream from the internal combustion engine, the temperature of the exhaust gases which are supplied to the particle filter, the cooling means temperature, the engine temperature and/or the environmental temperature are particularly suitable as the temperature quantities.

A particularly simple embodiment comes about if, as a function of the second state variable, threshold values are able to be predefined, as a function of which the special operating state is initiated and/or terminated.

Because a figure of merit is able to be specified as a function of the first and the second state variable, and because, as a function of its value, the special operating state is initiated, very many influences and/or quantities are able to be taken into consideration in the ascertainment of the figure of merit.

The exemplary method according to the present invention may be used in an exhaust gas aftertreatment system which includes at least one particulate filter, which is subjected to a regeneration in the special operating state. However, the procedural method is not limited to this application, but is also usable in other exhaust gas aftertreatment systems.

BRIEF DESCRIPTION OF THE DRAWINGS

FIG. 4 shows a table for clarifying or demonstrating the exemplary method according to the present invention.

DETAILED DESCRIPTION

Figure 1:
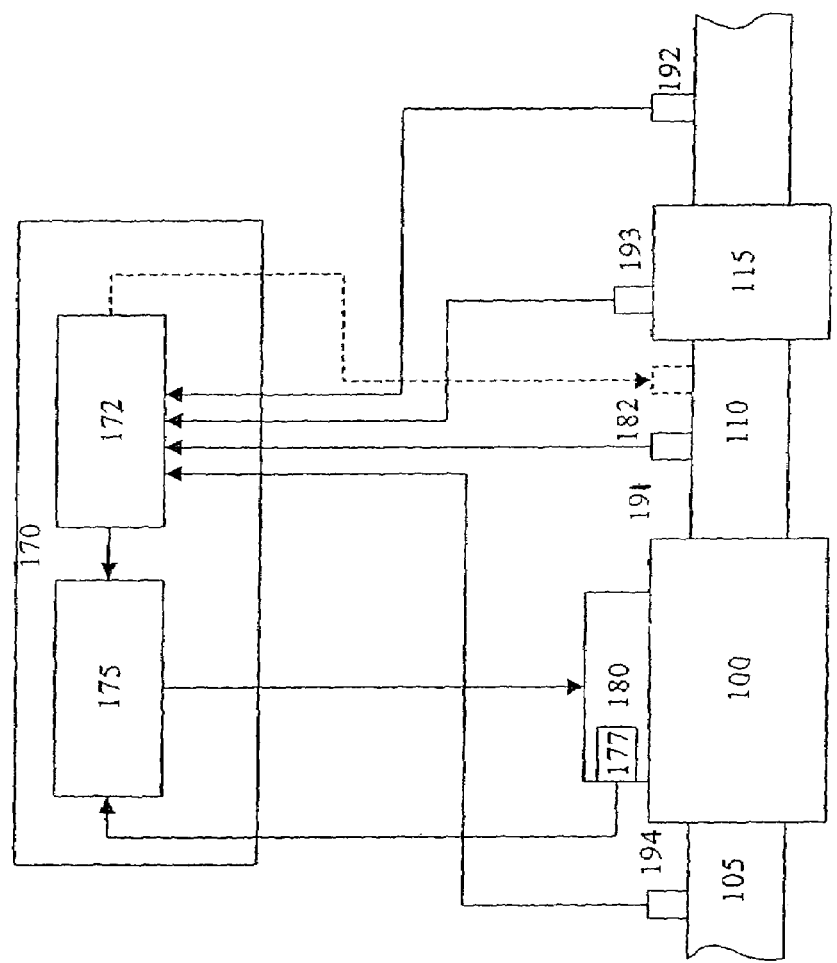
FIG. 1 shows a block diagram of the control system according to the present invention.

FIG. 1 shows the elements of an exhaust gas aftertreatment system of an internal combustion engine. The internal combustion engine is denoted by 100. It is supplied with fresh air through a fresh-air pipe 105. The exhaust gases of internal combustion engine 100 get to the environment through an exhaust pipe 110. An exhaust gas aftertreatment system 115 is arranged in the exhaust pipe. This may be a catalytic converter and/or a particulate filter. Moreover, it is possible to provide several catalytic converters for different pollutants, or combinations of at least one catalytic converter and one particulate filter.

Also provided is a control unit 170 which includes at least one engine control unit 175 and an exhaust gas aftertreatment control unit 172. Engine control unit 175 applies control signals to a fuel metering system 180. Exhaust gas treatment control unit 172 applies control signals to engine control unit 175 and, in one embodiment, to a control element 182 which is arranged in the exhaust pipe upstream of the exhaust gas treatment system or in the exhaust gas treatment system.

Moreover, various sensors are provided which feed signals to the exhaust gas aftertreatment control unit and to the engine control unit. Thus, provision is made for at least one first sensor 194 which delivers signals characterizing the state of the air which is fed to the internal combustion engine. A second sensor 177 delivers signals characterizing the state of fuel metering system 180. At least one third sensor 191 delivers signals characterizing the state of the exhaust gas upstream of the exhaust gas aftertreatment system. At least one fourth sensor 193 delivers signals characterizing the state of exhaust gas aftertreatment system 115. Moreover, at least one sensor 192 delivers signals characterizing the state of the exhaust gases downstream from the exhaust gas aftertreatment system. The sensors may be sensors which measure temperature values and/or pressure values. Moreover, sensors may also be used which characterize the chemical composition of the exhaust gas and/or of the fresh air. They are, for example, lambda sensors, NOX sensors or HC sensors.

The output signals of first sensor 194, of third sensor 191, of fourth sensor 193 and of fifth sensor 192 may be applied to exhaust gas aftertreatment control unit 172. The output signals of second sensor 177 may be applied to engine control unit 175. Further sensors (not shown), which characterize a signal with respect to the driver's command or further ambient conditions or engine operating states, may also be used.

It is particularly advantageous if the engine control unit and the exhaust gas treatment control unit form one structural unit. However, provision may also be made for them to be designed as two spatially separated control units.

In the following, the exemplary embodiment and/or exemplary method of the present invention is described using as an example a particulate filter which is used particularly for direct-injection internal combustion engines. However, the exemplary embodiment and/or exemplary method of the present invention is not limited to this use; it may also be used for other internal combustion engines having an exhaust gas treatment system. It can be used, in particular, in the case of exhaust gas aftertreatment systems featuring a combination of a catalytic converter and a particulate filter. Moreover, it is usable in systems which are equipped only with a catalytic converter.

Based on the existing sensor signals, engine control 175 calculates the control signals for sending to fuel metering system 180. This then meters in the appropriate fuel quantity to internal combustion engine 100. During combustion, particulates can develop in the exhaust gas. They are trapped by the particulate filter in exhaust gas aftertreatment system 115. In the course of operation, corresponding amounts of particulates accumulate in particulate filter 115. This impairs the functioning of the particulate filter and/or of the internal combustion engine. Therefore, provision is made for a regeneration process to be initiated at certain intervals or when the particulate filter has reached a certain loading condition. This regeneration may also be referred to as special operation.

The loading condition is detected, for example, on the basis of various sensor signals. Thus, first of all, it is possible to evaluate the differential pressure between the input and the output of particulate filter 115. Secondly, it is possible to ascertain the loading condition on the basis of different temperature and/or different pressure values. In addition, it is possible to utilize further variables to calculate or simulate the loading condition. A suitable procedure is known, for example, from German Published Patent Application No. 199 06 287.

When the exhaust gas aftertreatment control unit detects the particulate filter to have reached a certain loading condition, then the regeneration is initialized. Various possibilities are available for regenerating the particulate filter. Thus, first of all, provision may be made for certain substances to be fed to the exhaust gas via control element 182, which then cause a corresponding reaction in exhaust gas aftertreatment system 115. These additionally metered substances cause, among other things, an increase in temperature and/or an oxidation of the particulates in the particulate filter. Thus, for example, provision can be made for fuel and/or an oxidizing agent to be supplied via control element 182.

In one embodiment, provision can be made that a corresponding signal is transmitted to engine control unit 175 and that the engine control unit carries out a so-called postinjection. The postinjection makes it possible to selectively introduce hydrocarbons into the exhaust gas which contribute to the regeneration of the exhaust gas aftertreatment system 115 via an increase in temperature.

Usually, provision is made to determine the loading condition on the basis of different variables. By comparison to a threshold value, the different conditions are detected and the regeneration is initiated as a function of the detected loading condition.

Such exhaust gas aftertreatment systems have to run through a special operating state at certain intervals. In one particulate filter, the particulates accumulated in the filter during this special operating state are burned. To initiate this special operating state, such as the regeneration of a particulate filter, certain requirements are satisfied, for example, the temperature of the filter and thereby the exhaust gas temperature has to take on certain values. The initiation of this regenerating process is problematical. If it is initiated too early, this results in increased fuel usage. If it is initiated too late, on the one hand this leads to increased fuel usage, since the exhaust gas back pressure rises. Moreover, the case may come up in which very high temperatures are generated in the filter during regeneration, and under unfavorable conditions, this may lead to damage of the filter.

For the initiation of the regenerating process, it is ensured by measures that raise the temperature or lower the ignition temperature that the particulate in the filter is oxidized.

In the following exemplary embodiment described, regeneration is initiated when the pressure loss in the exhaust gas system exceeds a threshold value which may be predefined as a function of the rotary engine speed. The pressure loss is yielded by measured values of the pressure before and after exhaust gas aftertreatment system 115.

According to the exemplary embodiment and/or exemplary method of the present invention, the threshold value for the pressure loss in the exhaust gas system is measured as a function of the rotational speed of the engine in the non-loaded and the loaded state and is stored in a characteristics map. The number of exceeding incidents is summed up, so that individual stochastic exceeding incidents of the threshold value do not lead to an undesired triggering of a regeneration. In this context, as to FIG. 2a, the number K of exceeding incidents is a further state variable characterizing the regenerating process. If the number of exceeding incidents is less than a first threshold value, no regeneration takes place, but if it is more than the first but less than the second threshold value, a regeneration is able to be initiated if favorable operating conditions are present. If the number is greater than the second threshold value, regeneration takes place even in the presence of unfavorable conditions.

Figure 2A:
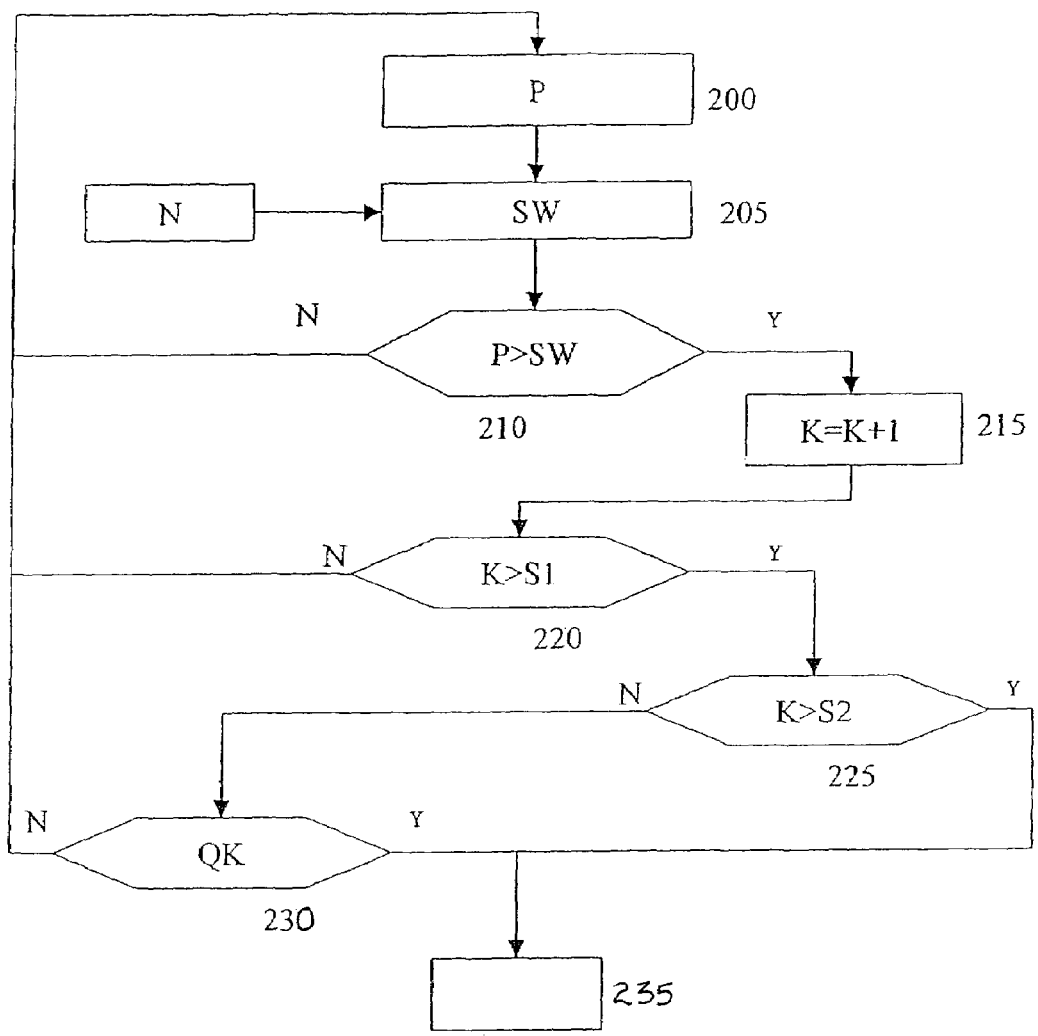
FIG. 2a shows a first flow chart for an exemplary method according to the present invention.
Figure 2B:
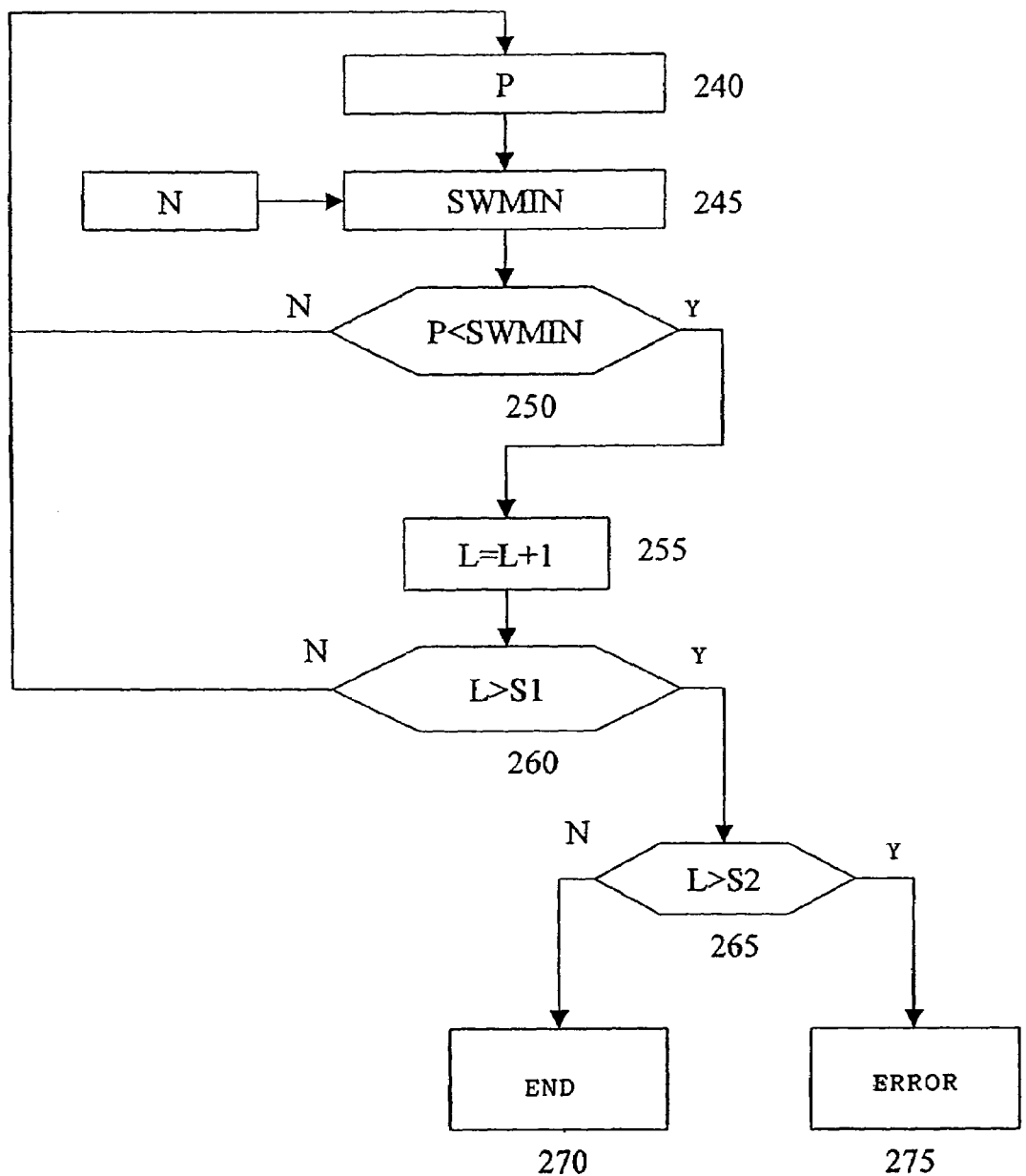
FIG. 2b shows a second flow chart for the exemplary method according to the present invention.

As to FIG. 2b, if the regeneration is initiated, the number L of the exceeding incidents is checked using a minimum threshold SWMIN. If the number L of the exceeding incidents is less than a first threshold value, regenerating is continued. In step 265, if the number L of the exceeding incidents is greater than a first threshold value and less than a second threshold value, the regenerating program ends in step 270. Otherwise, if the number of exceeding incidents L is greater than a second threshold, a fault is detected in step 275. The procedural method is described with the aid of the flow diagram of FIGS. 2a and 2b.

As further regards FIG. 2b, block or steps 240, 245, 250, 255 and 260 essentially correspond to those of blocks or steps 200, 205, 210, 215 and 225, which are described below, except that FIG. 2b concerns the counter L, whereas FIG. 2a concerns the counter K.

With respect to FIG. 2a, in a first step 200 a variable P is determined, which characterizes the loading state of the particulate filter. In the specific embodiment shown, the pressure loss is evaluated for this purpose. In this connection, the pressure difference between the input and the output of the particulate filter is involved.

Subsequently, in step 205, a threshold value SW is ascertained, starting from the rotational speed of the internal combustion engine and/or other characteristic quantities, such as the load on the internal combustion engine and/or the injected quantity of fuel. This threshold value SW is selected so that it corresponds to a pressure difference present when the particulate filter is loaded.

Subsequent interrogation 210 checks whether this variable P is greater than a threshold value SW. If this is not the case, the program continues with step 200. If interrogation 210 detects that pressure loss P is greater than threshold value SW, then in step 215 a counter K is increased by 1. The subsequent interrogation 220 checks whether the value K of the counter is greater than a first value S1. If this is not the case, the program likewise continues with step 200. If the interrogation detects that the content of the counter is greater than the first value S1, an interrogation 225 then checks whether the counter value is greater than a second value S2. If so, then in step 235 the regeneration of the particulate filter is initiated. This means that, if the number of exceeding incidents of threshold value SW is greater than second value S2, the regeneration is initiated in any case.

If interrogation 225 detects that the value of counter K is less than second value S2, an interrogation 230 follows, which checks whether certain operating states are present. If this is not the case, step 200 follows. If it is the case, i.e. certain operating states are present which are favorable for regeneration, the regeneration is carried out in step 235.

This means that, if the loading state of the filter has reached a certain value, regeneration is carried out when favorable operating conditions are present. When a further loading state is reached, regeneration of the filter takes place independently of the operating state.

The injected fuel quantity or a variable corresponding to this magnitude may be used as the operating state. Alternatively or supplementingly, the exhaust gas temperature or a temperature value characterizing the temperature of the exhaust gas aftertreatment system may also be used.

Figure 3:
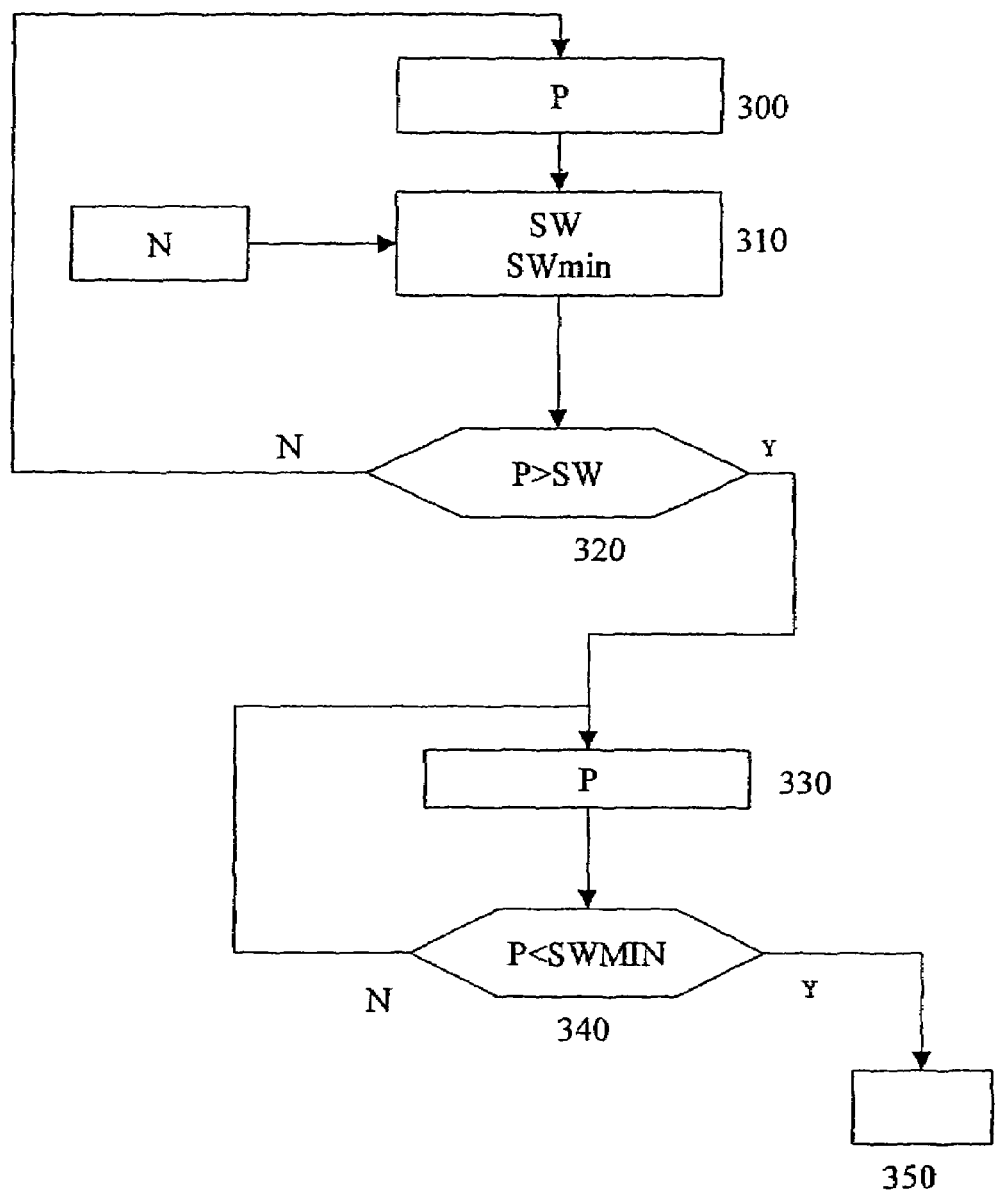
FIG. 3 shows another exemplary embodiment according to the present invention.

Another exemplary method according to the present invention is shown in FIG. 3 by a flow diagram.

Each regeneration of a particulate filter requires additional fuel conditioned upon additional post-injections or operating states having a worse efficiency factor. This additional usage may be reduced by suitable methods. According to the exemplary embodiment and/or exemplary method of the present invention, this is ensured in that the initiation of the regeneration and/or the duration of the regeneration is determined as a function of the state of the internal combustion engine and/or the exhaust gas aftertreatment system for optimum consumption.

Thus, when good regeneration conditions are present, such as at high load temperature and high exhaust gas temperature, the threshold value for loading, at which the regeneration is initiated, is shifted to smaller values in order to exploit the good conditions for regeneration. In this context, regeneration is carried out when good conditions are present, even when it is not yet absolutely necessary. According to the exemplary embodiment and/or exemplary method of the present invention, at states in which a regeneration is possible only with difficulty, i.e. at bad regeneration conditions, regeneration is carried out only so long as to avoid clogging of the filter, i.e. the threshold value for ending the regeneration is shifted correspondingly to higher values.

This means a flexible determination of the limits for switching on and switching off the regeneration is selected as a function of the engine condition. FIG. 3 shows an appropriate procedure as a flow chart. In a first step 300, loading state P of the particulate filter is detected. For this, for instance, the pressure difference between the input and the output of the particulate filter may be used. Subsequently, in step 310 a first threshold value SW and a second threshold value SWMIN are determined, starting from the operating state of the internal combustion engine and/or the particulate filter. Rotational speed N and/or a signal with respect to the injected amount of fuel QK may be used for this.

First threshold value SW indicates the value at which regeneration is to be initiated. Second threshold value SWMIN indicates the value at which regeneration is to be terminated. Subsequently, in step 320, the loading state is compared to threshold value SW. If the loading state is greater than first threshold value SW, the regeneration is initiated, otherwise the program continues with step 300. If regeneration is initiated, in step 330 the loading state is detected again, and is subsequently compared to second threshold value SWMIN in step 340. If the loading state is less than the second threshold value, further regeneration is performed in step 330 and the loading state is detected anew. If the loading state is less than second threshold value SWMIN, regeneration is ended in step 350.

In this context, according to the exemplary embodiment and/or exemplary method of the present invention, it is provided that the threshold values are continuously adjusted to the current loading state. Therefore, the second threshold value is currently recalculated in each case between steps 330 and 340.

The threshold values may be read out in step 310 from characteristic curves or characteristic maps. The determination of these characteristic curves and characteristic maps is very costly within the framework of the application. Therefore, as an alternative it is provided that a so-called fuzzy system be used for initiating and ending the regeneration. In this context, various input variables, such as air temperature, engine temperature, load and soot mass are evaluated, and subsequently linked with the aid of fuzzy logic. An appropriate table for explaining this procedure is shown in FIGS. 4a and 4b.

In partial FIG. 4a are shown in tabular form air temperature TL, engine temperature TM and the load. The temperature values may be recorded with the aid of sensors 194 and 177. In a directly injecting internal combustion engine, a variable may be used as load variable which characterizes the fuel quantity injected.

In this context, three load ranges denoted as low, medium and high, as well as three temperature ranges "cold", "medium" and "hot" are shown both for the charge air as well as for engine temperature TM. For each combination of load, engine temperature TM and air temperature TL an evaluation value for a possible regeneration is determined. In this context, a difference is made between "bad", medium" and "good". The value "good" comes about especially at high load and high temperatures. The value "bad" comes about especially at low loads and low temperatures. In this context, the table shown was picked only as an example; other values may be predefined as well.

A second table is shown in FIG. 4b in which the regeneration conditions and the particulate loading are shown. In the particulate loading a difference is made between "very low", "low", "medium", "high" and "very high". In the case of the regeneration conditions, the values "good", "medium" and "bad" are shown in Table 4a. To each pair of values there is assigned the state "regeneration switched off" or "regeneration switched on". If the number of particles is low, i.e. the loading state is low or very low, as a rule, there is no regeneration. In the case of medium particulate loading, regeneration takes place only when there are good regenerating conditions, a regeneration taking place in general at very high loading conditions.

These table values, too, have only been picked as examples.

In another exemplary method according to the present invention, various characteristic variables and parameters, present in the engine control unit, are taken into consideration in the decision as to whether, and using which measures, a regeneration is carried out. Starting from the signals and variables present in the control unit, a figure of merit is determined which is characteristic for the state of the engine and/or the exhaust gas system.

Figure 5A:
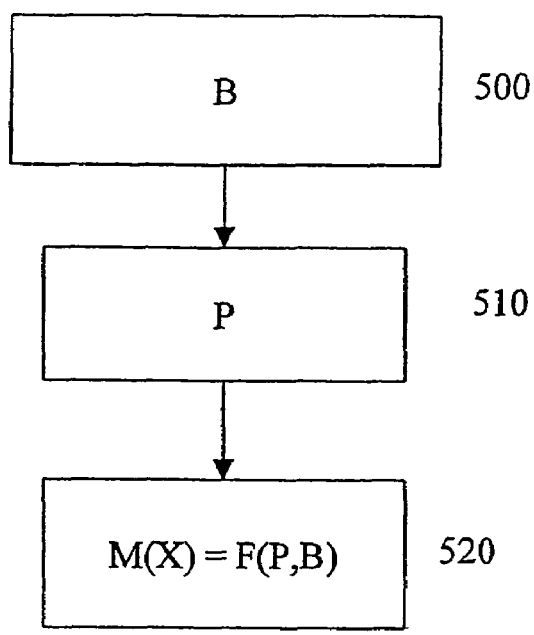
FIG. 5a shows a flow chart for determining M(X) as a function of P and B, with respect to the exemplary method.
Figure 5B:
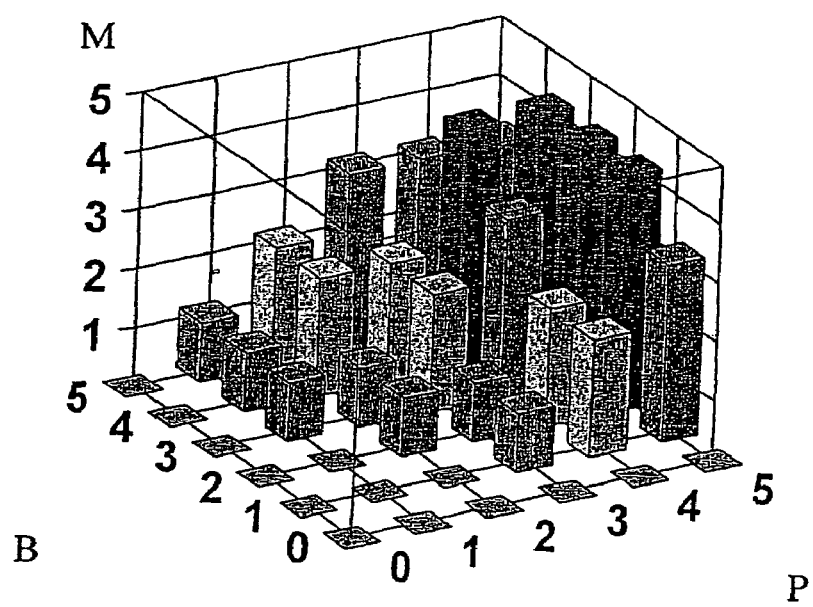
FIG. 5b shows a three-dimensional chart of M(X) as a function of P and B, with respect to the exemplary method.

With respect to FIGS. 5a and 5b, merit B is linked with the current loading state P of the particulate filter so as to determine the regeneration measure to be carried out. This yields the following advantages. An initiation of the regeneration, if the latter cannot be successfully carried out, takes place only when it is absolutely necessary, i.e. when the filter threatens to clog. A premature initiation of the regeneration measures takes place if the filter loading has reached an appropriate value, the state of the engine system and the exhaust system as well as the driving state favor regeneration. Furthermore, suitable measures, that are a function of the operating state, may be selected when regeneration is necessary. By these measures the overall usage of fuel may be minimized.

The available data, such as the rotational engine speed, the injection quantity, the exhaust gas volume flow, the exhaust gas temperature, particularly upstream of the catalytic converter, the engine temperature, the environmental temperature, the driving speed and/or the time since the last regeneration are evaluated. Starting from these variables, the figure of merit B is ascertained. Loading state P of the particulate filter is determined starting from the various measured variables, such as the pressure difference between the output and the input of the filter.

The individual signals are filtered. Filtering is carried out, which may be done using a PT1 filter, which fades out short-time signal changes. In particular, it is provided that short-term changes of the operating states shall not be taken into consideration. Thus, for example, the change in the rotational speed, the injected fuel quantity and/or other variables during change of gear is influenced by the filtering in such a way that no change in the operating state is detected.

By comparison to various threshold values of the recorded variables, in step 500 of FIG. 5a, merit B is determined for the current state of the internal combustion engine and/or the exhaust gas system.

Thus it is provided, for example, that in the case of high rotational speeds, large injection quantities, a low exhaust gas volume flow, a high exhaust gas temperature, particularly upstream of the catalytic converter, a high engine temperature, a high environmental temperature, a high figure of merit is specified which is a sign for a favorable regeneration. One the other hand, at low rotational engine speeds, low injection quantities, a large exhaust gas volume flow, a low exhaust gas temperature, a low engine temperature, a low environmental temperature, a low figure of merit is specified, which is a sign for an unfavorable regeneration.

Moreover, the time from the last regeneration, especially the last successful regeneration carried out, is taken into consideration for the specification of figure of merit B. In this context, which may be the time during which the internal combustion engine and/or the exhaust gas treatment system were operated is taken into consideration. As an alternative, the fuel quantity injected since the last regeneration or a variable characterizing the fuel quantity may also be used. Instead of time, the distance covered by the vehicle may also be an input into ascertaining merit B of FIGS. 5a and 5b.

With respect to FIG. 5a, loading state P of the particulate filter is determined starting from the various measured variables, such as the pressure difference between the output and the input of the filter. In step 510 the quantity P, which characterizes the loading state, is determined.

In step 520, measures for regeneration are initiated based on the figure of merit and the loading state. Different measures as a function of figure of merit B and/or loading state P may be specified.

One example of the specification of measures starting from figure of merit B and loading state P is illustrated in FIG. 5b. In this instance, six different figures of merit B for the operating state and six figures of merit P for the loading state are provided. This is only selected as an example. Other values and more or fewer figures of merit could also be selected. A measure M is allocated to each combination of figure of merit B and loading state P. In this context, different or combinations of different measures may also be provided.

Measures in the area of fuel metering may be provided as a measure. Thus, for example it is provided that a postinjection take place so as to input hydrocarbons into the exhaust gas. Alternatively, the fuel may also be injected directly into the exhaust tract. Moreover, it may be provided that the injection process is changed. For, example, it may be provided that the centroid of the injection occurs in the direction of being late postponed, or that a pre-injection and/or a postinjection takes place and/or that these are postponed in time.

Furthermore, measures in the area of air supply to the internal combustion engine may be provided. Thus, for example, the supply of the fresh air quantity may be reduced using a throttle valve, the quantity of recirculated exhaust gas may be increased, or the loading pressure may be changed.

In addition, other measures are possible that lead to an increase in the exhaust gas temperature. Thus, for example, additional heating, particularly electrical additional heating of the particulate filter may be provided. It is also possible to add certain substances, that have the effect of raising the temperature and/or lowering the reaction temperature, to the fuel or meter them into the exhaust gas system.

In another embodiment, the regeneration takes place as a function of the driving procedure of the driver. In the case of a sportive driver, where the engine is almost always at operating temperature, regeneration of the particulate filter may be achieved with relatively little effort. In the case of such a driver the particulate filter control may be based on the assumption that an operating point favorable for regeneration occurs frequently. A pending regeneration may be delayed in case of a regeneration state that is coincidentally bad. In the case of a very careful or restrained driver, or a driver who frequently drives only short distances, the particulate filter control takes advantage of every engine condition in which a regeneration is possible to carry out a regeneration. By doing this it may be prevented that, during a later short distance drive, having clearly higher additional consumption of fuel, a regeneration has to be carried out.

Threshold values SW for initiating regeneration and threshold value SWmin for ending regeneration may be specified as a function of the driving procedure of the driver. According to the exemplary embodiment and/or exemplary method of the present invention, in the specific embodiment of FIG. 2, in step 205 threshold value SW is selected as a function of the driving procedure, and in the specific embodiment according to FIG. 3, the threshold values in step 310 are selected as a function of the driving procedure.

Not only is the current driving procedure taken into consideration, but the average driving procedure over a greater time span may also be taken into consideration. For this purpose, data with respect to the driving procedure are stored in a nonvolatile memory of the control unit. The driving procedure may be evaluated as a function of the engine temperature reached, the duration of the trip and the maximum driving force achieved over a certain time period and/or efficiency of the internal combustion engine. Starting with these variables, drivers are subdivided, for example, into three classes. These may be short distance drivers, normal drivers and long distance drivers. The subdivision is made, for instance, in that, within the stored trips, the number of trips is determined in which the minimum engine temperature, the duration of the trip or the driving force exceed certain threshold values. In relation to the frequency and/or duration of the exceeding, the drivers are placed into one of the classes. As a result of the classification, the threshold values for initiating and ending the regeneration are then specified.

Figure 6:
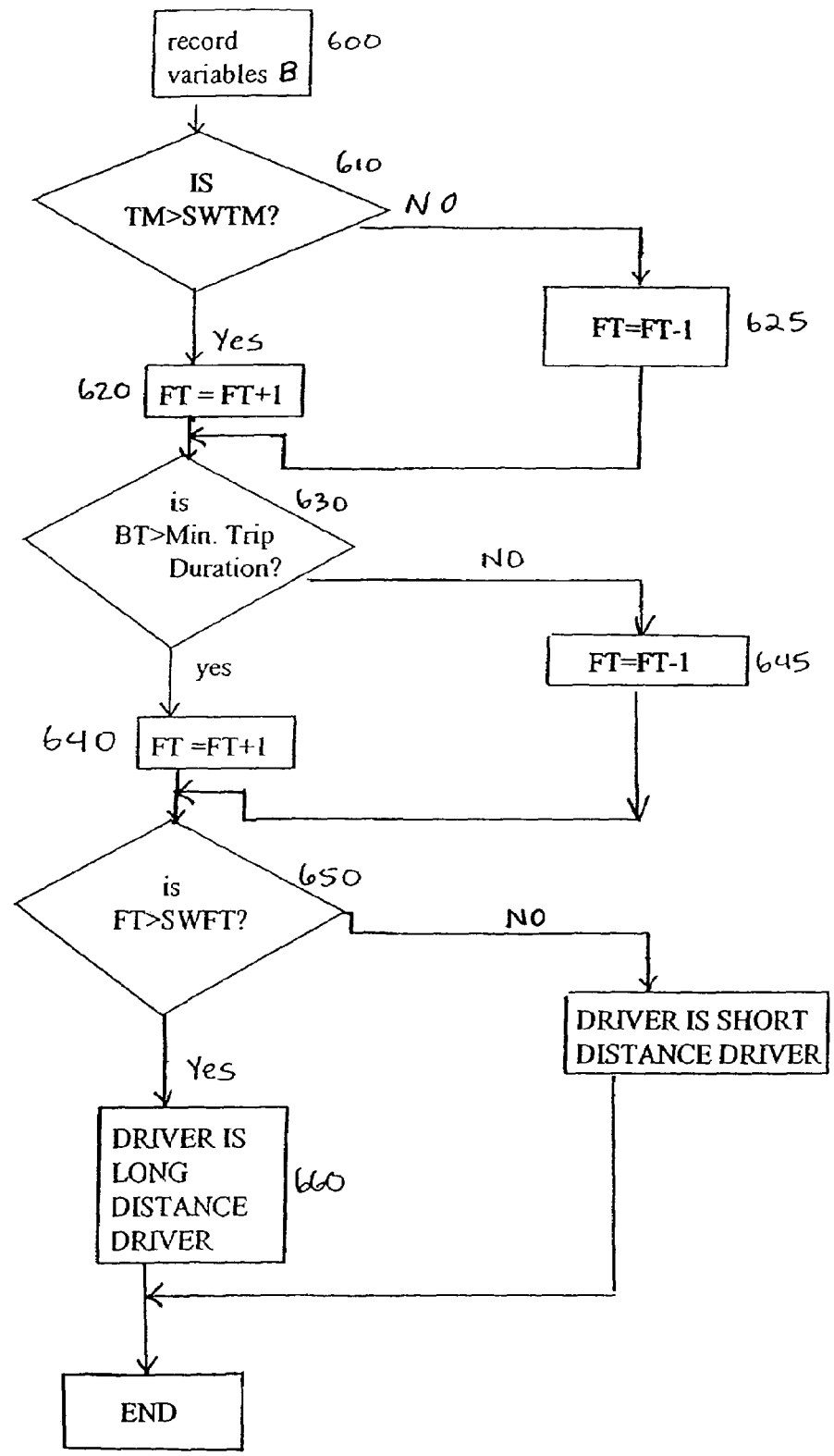
FIG. 6 shows an exemplary method for determining the driver type.

A possible procedure of a simplified specific embodiment for ascertaining the driver type is shown in FIG. 6. In a first step 600, various operating characteristic variables B are recorded, which characterize the procedural method of the driver. These may be engine temperature MT, trip duration BT and a variable characterizing the minimum driving force. For this, one may, for example, draw upon load and/or fuel quantity QK to be injected. As further variables, in a supplementary or alternative manner, the respective driving distance in each driving cycle, the engine efficiency and/or the driver's command signal may be evaluated.

A first interrogation 610 checks whether a first of these signals, in the example shown this is engine temperature TM, is greater than a minimum engine temperature SWTM. If this is the case, a counter FT is increased by 1 in step 620. If this is not the case, a counter FT is decreased by 1 in step 625. Subsequently, in a second interrogation 630 it is checked whether a second variable, in the example shown it is the operating duration BT, is greater than a minimum trip duration. If this is the case, a counter FT is also increased by 1 in step 640. If this is not the case, the counter is decreased by 1 in step 645. Additional interrogations that are not shown may succeed interrogation 630, in which additional variables are interrogated with respect to a threshold value.

Subsequent interrogation 650 checks whether counter FT is greater than a threshold value SWFT. If this is the case, in step 660 it is recognized that the driver, for instance, is a long distance driver; if this is not the case, it is recognized in step 665 that the driver is, rather, a short distance driver.

This function may be carried out immediately before, during or after shutting off the vehicle. The corresponding value of the counter or the classification of the driver determined in steps 650 to 665 is stored, so that it will be available again the next time the vehicle is operated. The data ascertained in this manner are taken into consideration in controlling regeneration.

Variable P, which characterizes the loading state of the particulate filter, may be determined from the pressure difference between the pressure at the input and at the output of the particulate filter. However, other procedures for determining the loading state may also be used. Thus, the loading state may also be simulated starting with various variables.

In the exemplary embodiments shown, in the case of the loading state, a difference is made between only two states. It may also be provided that differentiation is made between additional states.

What is claimed is:

1. A method for controlling a regeneration of a particulate filter in an exhaust gas aftertreatment system of an internal combustion engine, comprising:
ascertaining a first state variable that characterizes a state of the exhaust gas aftertreatment system;
ascertaining a second state variable that takes into consideration a further influence on a special operating state;
in the case of a first value of the first state variable, initiating the special operating state as a function of the first state variable and the second state variable; and
in the case of a second value of the first state variable, initiating the special operating state at all values of the second state variable;
wherein the second state variable characterizes a state of at least one of the internal combustion engine, an environmental condition, and a type of driver.

2. The method as recited in claim 1, wherein:
as a function of at least one of the first state variable and the second state variable, different special operating states are initiated.

3. The method as recited in claim 1, further comprising:
determining the first state variable as a function of at least one of a measured variable and a control variable.

4. The method as recited in claim 1, wherein:
the second state variable is specifiable from at least one variable that characterizes at least one of a rotational speed of the internal combustion engine, a fuel injection quantity, a load, an exhaust gas volume flow, a temperature magnitude, a driving speed, and a time since a preceding special operating state.

5. The method as recited in claim 1, wherein:
a threshold value is specifiable as a function of the second state variable, and
the special operating state is at least one of initiated and ended as a function of the threshold value.

6. The method as recited in claim 1, wherein:
as a function of the first state variable and the second state variable, a figure of merit is specifiable, and
as a function of a value of the figure of merit, the special operating state is initiated.

7. The method as recited in claim 1, wherein:
a fuzzy logic initiates the special operating state as a function of one of:
at least one of the first state variable and the second state variable, and
a variable interpreted for a formation of one of the first state variable and the second state variable.

8. The method as recited in claim 1, wherein a threshold value for a pressure loss in the exhaust gas system is measured as a function of a parameter of the engine in a non-loaded and a loaded state and is stored in a characteristics map, and a number of exceeding incidents in which the threshold value is exceeded is summed up, so that individual stochastic exceeding incidents of the threshold value do not result in an undesired initiating of the special operating state.

9. The method as recited in claim 8, wherein the parameter of the engine is a rotational speed.

10. The method as recited in claim 8, wherein the special operating state includes a regeneration of the exhaust gas aftertreatment system.

11. The method as recited in claim 1, wherein:
the exhaust gas aftertreatment system includes the particulate filter.

12. The method as recited in claim 11, wherein:
the regeneration of the particulate filter is carried out as the special operating state.

13. The method as recited in claim 1, wherein:
a number of exceeding incidents is a further state variable characterizing the special operating state,
if the number of exceeding incidents is less than a first threshold value, the special operating state is not initiated,
if the number of exceeding incidents is more than the first threshold value but less than a second threshold value, the special operating state is able to be initiated, and
if the number of exceeding incidents is greater than the second threshold value, the special operating state is initiated.

14. The method as recited in claim 13, wherein:
if the special operating state is initiated, another number of the exceeding incidents is checked using a minimum threshold,
if the another number of the exceeding incidents is less than the first threshold value, the special operating state is continued,
if the another number of the exceeding incidents is greater than the first threshold value and less than the second threshold value, the special operating state ends, and
if the another number of exceeding incidents is greater than the second threshold, a fault is detected.

15. The method as recited in claim 14, wherein the special operating state includes a regeneration of the exhaust gas aftertreatment system.

16. A device for controlling a regeneration of a particulate filter in an exhaust gas aftertreatment system of an internal combustion engine, comprising:
an arrangement for ascertaining a first state variable that characterizes a state of the exhaust gas aftertreatment system;
an arrangement for ascertaining a second state variable that takes into consideration a further influence on a special operating state;
an arrangement for, in the case of a first value of the first state variable, initiating the special operating state as a function of the first state variable and the second state variable; and
an arrangement for, in the case of a second value of the first state variable, initiating the special operating state at all values of the second state variable;
wherein the second state variable characterizes a state of at least one of the internal combustion engine, an environmental condition, and a type of driver.

17. The device as recited in claim 16, wherein a threshold value for a pressure loss in the exhaust gas system is measured as a function of a parameter of the engine in a non-loaded and a loaded state and is stored in a characteristics map, and a number of exceeding incidents in which the threshold value is exceeded is summed up, so that individual stochastic exceeding incidents of the threshold value do not result in an undesired initiating of the special operating state.

18. The device as recited in claim 17, wherein the parameter of the engine is a rotational speed.

19. The device as recited in claim 17, wherein the special operating state includes a regeneration of the exhaust gas aftertreatment system.

20. The device as recited in claim 16, wherein:
a number of exceeding incidents is a further state variable characterizing the special operating state,
if the number of exceeding incidents is less than a first threshold value, the special operating state is not initiated,
if the number of exceeding incidents is more than the first threshold value but less than a second threshold value, the special operating state is able to be initiated, and
if the number of exceeding incidents is greater than the second threshold value, the special operating state is initiated.

21. The device as recited in claim 20, wherein:
if the special operating state is initiated, another number of the exceeding incidents is checked using a minimum threshold,
if the another number of the exceeding incidents is less than the first threshold value, the special operating state is continued,
if the another number of the exceeding incidents is greater than the first threshold value and less than the second threshold value, the special operating state ends, and
if the another number of exceeding incidents is greater than the second threshold, a fault is detected.

22. The device as recited in claim 21, wherein the special operating state includes a regeneration of the exhaust gas aftertreatment system.

* * * * *